(12) United States Patent
Lim et al.

(10) Patent No.: US 12,461,390 B2
(45) Date of Patent: Nov. 4, 2025

(54) INJECTION-MOLDED PRODUCT

(71) Applicant: LG Chem, Ltd., Seoul (KR)

(72) Inventors: Eun Jung Lim, Daejeon (KR); Dong Hyun Oh, Daejeon (KR); Jin Hong Kim, Daejeon (KR); Min Jun Gim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 839 days.

(21) Appl. No.: 17/623,421

(22) PCT Filed: Jul. 1, 2020

(86) PCT No.: PCT/KR2020/008592
§ 371 (c)(1),
(2) Date: Dec. 28, 2021

(87) PCT Pub. No.: WO2021/002672
PCT Pub. Date: Jan. 7, 2021

(65) Prior Publication Data
US 2022/0350172 A1    Nov. 3, 2022

(30) Foreign Application Priority Data
Jul. 2, 2019 (KR) .................. 10-2019-0079570

(51) Int. Cl.
*G02C 7/12* (2006.01)
*G02B 1/04* (2006.01)
*G02B 5/30* (2006.01)

(52) U.S. Cl.
CPC .............. *G02C 7/12* (2013.01); *G02B 1/041* (2013.01); *G02B 5/3016* (2013.01)

(58) Field of Classification Search
CPC ......... G02B 1/041; G02B 5/3016; G02C 7/12
(Continued)

(56) References Cited

U.S. PATENT DOCUMENTS

2004/0257508 A1    12/2004    Van De Witte et al.
2012/0229732 A1     9/2012    Koike et al.
(Continued)

FOREIGN PATENT DOCUMENTS

CN    1621899 A    6/2005
DE    3543357 A1   6/1987
(Continued)

OTHER PUBLICATIONS

Extended European Search Report including Written Opinion for Application No. 20834491.1 dated Jul. 25, 2022, pp. 1-9.
(Continued)

*Primary Examiner* — Bumsuk Won
*Assistant Examiner* — Grant A Gagnon
(74) *Attorney, Agent, or Firm* — Lerner David LLP

(57) ABSTRACT

An injection-molded product or an eyewear is provided. The injection-molded product or the eyewear may be an optically compensated injection-molded product, which may resolve optical defects such as a rainbow phenomenon occurring in the injection-molded product or the eyewear. The injection-molded product may include an injection-molded body and a retardation film disposed on at least one side of the injection-molded body. The retardation film has an in-plane phase difference of 1,000 nm or more for light having a wavelength of 550 nm, and wherein an angle formed by a slow axis of the retardation film and an injection direction of the injection-molded body is in a range from 0 degree to 80 degrees.

11 Claims, 12 Drawing Sheets

(58) Field of Classification Search
USPC ........................................................ 351/159
See application file for complete search history.

(56) References Cited

U.S. PATENT DOCUMENTS

| | | | |
|---|---|---|---|
| 2013/0235581 A1 | 9/2013 | Iatan | |
| 2015/0062701 A1* | 3/2015 | Horikoshi | G02B 5/3083 |
| | | | 359/489.05 |
| 2015/0205011 A1 | 7/2015 | Gotou et al. | |
| 2019/0079304 A1 | 3/2019 | Ando et al. | |
| 2020/0050045 A1 | 2/2020 | Oh et al. | |

FOREIGN PATENT DOCUMENTS

| | | |
|---|---|---|
| EP | 0226848 A2 | 7/1987 |
| JP | H11509578 A | 8/1999 |
| JP | 2005157082 A | 6/2005 |
| JP | 4888853 B2 | 2/2012 |
| JP | 2012098515 A | 5/2012 |
| JP | 2012198326 A | 10/2012 |
| JP | 2012215725 A | 11/2012 |
| JP | 2014174271 A | 9/2014 |
| JP | 2017167268 A | 9/2017 |
| JP | 2017227879 A | 12/2017 |
| JP | 6290082 B2 | 3/2018 |
| KR | 20130029746 A | 3/2013 |
| KR | 20180121028 A | 11/2018 |
| TW | 201727286 A | 8/2017 |
| WO | 2019079033 A1 | 4/2019 |

OTHER PUBLICATIONS

International Search Report for PCT/KR2020/008592 dated Oct. 15, 2020. 2 pgs.

* cited by examiner

INJECTION-MOLDED PRODUCT

CROSS-REFERENCE TO RELATED APPLICATION(S)

The present application is a national stage entry under 35 U.S.C. § 371 of International Application No. PCT/KR2020/008592 filed on Jul. 1, 2020, which claims priority based on Korean Patent Application No. 10-2019-0079570 filed on Jul. 2, 2019, the disclosure of which is incorporated herein by reference in its entirety.

TECHNICAL FIELD

The present application relates to an injection-molded product.

BACKGROUND ART

An injection molding method is a typical plastic molding method. The injection molding is one of the molding methods of plastics using a mold, where a material such as plastics is heated to be melted, and then, injected into a mold and cooled to obtain a product having a desired shape. FIG. 1 is one example of an injection molding machine. As shown in FIG. 1, the injection molding machine may be composed of a hopper (C) for introducing a material, a cylinder (A) that the introduced material is melted by heating, a nozzle (B) for injecting the molten material into a mold (D), and the like. Using the injection molding machine as in FIG. 1, the material is introduced into the hopper (C), melted in the cylinder (A), and then injected into the mold (D) using the nozzle (B). In FIG. 1, the mold (D) is in an open form, but at the time of introducing the material thereto, the mold (D) may be closed, and the mold (D) is opened after cooling of the material, whereby the product can be obtained. The injection molding machine illustrated in FIG. 1 and the injection molding method are one example, and in addition to the above, injection-molded products may be obtained in various ways using various molding machines.

Such an injection molding method has an advantage that a desired product can be obtained at a low cost compared to other methods such as an extrusion method, which is the same plastic processing method. However, in the injection molding method, a lot of stress is applied to the material and the direction in which the stress is applied is also random, so that many phase differences occur in the product and the optical axis direction is also random. Therefore, when the injection-molded product is a product worn or used outdoors, such as glasses or goggles, a defect called a rainbow phenomenon is caused outdoors.

FIGS. 2 and 3 are photographs of products manufactured in the form of goggles, FIG. 2 is a photograph of a product manufactured by an injection molding method, and FIG. 3 is a photograph of a product manufactured by an extrusion molding method. FIGS. 2 and 3 are both cases in which the goggles are each observed under a polarized light source, where as shown in the drawing, the rainbow phenomenon occurs severely in the product manufactured by the injection molding method (FIG. 2).

DISCLOSURE

Technical Problem

This application relates to an injection-molded product. Specifically, the present application relates to an optically compensated injection-molded product, and relates to an injection-molded product that resolves optical defects such as a rainbow phenomenon occurring in injection-molded products.

Technical Solution

In this specification, the term 'vertical, parallel, orthogonal, or horizontal' defining an angle and an angular numerical value mean 'substantially vertical, parallel, orthogonal, or horizontal' and the substantially numerical value of the angle within a range without impairing the desired effect. Therefore, the vertical, parallel, orthogonal, or horizontal and the numerical range of the angle may include errors such as manufacturing errors or variations. For example, the above cases, may each include, for example, an error within about ±5 degrees, an error within ±4.5 degrees, an error within ±4 degrees, an error within ±3.5 degrees, an error within ±3 degrees, an error within ±2.5 degrees, an error within ±2 degrees, an error within ±1.5 degrees, an error within ±1 degree, an error within ±0.9 degrees, an error within ±0.8 degrees, an error within ±0.7 degrees, an error within ±0.6 degrees, an error within ±0.5 degrees, an error within ±0.4 degrees, an error within ±0.3 degrees, an error within ±0.2 degrees or an error within ±0.1 degrees.

Among physical properties mentioned in this specification, when the measured temperature affects relevant physical properties, the physical properties are physical properties measured at room temperature, unless otherwise specified. The term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

The phase difference and refractive index mentioned in this specification mean a phase difference and a refractive index for light having a wavelength of about 550 nm, respectively, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, the angle measured in the clockwise direction may be represented as a positive number, and the angle measured in the counterclockwise direction may be represented as a negative number.

In this specification, the terms injection-molded product and injection-molded body refer to different objects. The injection-molded body is an object obtained by applying a plastic material to injection molding, and the injection-molded product means a product including the object and other components (for example, retardation film) together.

In this specification, the in-plane phase difference of the retardation film is a physical amount derived by Equation 1 below, and the thickness direction phase difference is a physical amount derived by Equation 2 below.

$$Rin = d \times (nx - ny) \qquad \text{[Equation 1]}$$

$$Rth = d \times (nz - ny) \qquad \text{[Equation 2]}$$

In Equations 1 and 2, d is the thickness of the retardation film, and nx, ny, and nz are the refractive index in the slow axis direction, the refractive index in the fast axis direction, and the refractive index in the thickness direction, of the retardation film, respectively. The meanings of the slow axis and the fast axis are as known in the industry.

In the present application, optical defects occurring in the injection-molded body may be resolved by applying a predetermined retardation film in a predetermined arrangement together with the injection-molded body.

In one example, the optically compensated injection-molded body of the present application may comprise an injection-molded body and a retardation film formed or disposed on at least one side of the injection-molded body.

The specific type of the injection-molded body is not particularly limited, and all kinds of injection-molded bodies as various known types of injection-molded bodies, in which optical defects such as the rainbow phenomenon are confirmed, may be applied in the present application. Particularly, the injection-molded body, such as an eyewear, which is worn or used outdoors, so that optical defects are more problematic, is an example of typical injection-molded bodies applied in the present application. In this case, the specific type of the eyewear is not particularly limited, which may have, for example, the form shown in FIG. 2 or 3, and the like.

The type of the injection-molded body is also not particularly limited, which may be in, for example, a two-dimensional shape such as a film or a sheet, or may also have a three-dimensional shape or other complicated shapes.

The injection-molded body applied in the present application may have, for example, a phase difference for a wavelength of 550 nm within a range of 800 nm to 3,000 nm. Such a phase difference may be expressed by the orientation of a plastic, which is a material, due to stress or the like applied during a forming process of an injection-molded body. In another example, the phase difference may be about 850 nm or more, 900 nm or more, 950 nm or more, 1000 nm or more, 1100 nm or more, 1200 nm or more, 1300 nm or more, 1400 nm or more, 1500 nm or more, 1600 nm or more, 1700 nm or more, 1800 nm or more, or 1900 nm or more, or may be 2900 nm or less, 2800 nm or less, 2700 nm or less, 2600 nm or less, 2500 nm or less, 2400 nm or less, 2300 nm or less, 2200 nm or less, 2100 nm or less, or 2000 nm or less or so. The phase difference of the injection-molded body is obtained as a result of being measured in the manner described in examples herein. In one example, the phase difference may be the in-plane phase difference of the injection-molded body. Here, the in-plane direction of the injection-molded body is a direction approximately parallel to the in-plane direction of the retardation film applied to the injection-molded body. Since the injection-molded body is randomly stressed during a forming process, the slow axis is also formed randomly, whereby a certain slow axis cannot be defined.

The type of the material forming the injection-molded body is not particularly limited, and any plastic material usually applied to the production of the injection-molded body can be applied in the present application. Such a material may be exemplified by one or more plastics selected from the group consisting of polyvinyl chloride, polyolefin, polyester, nylon, polyamide, polysulfone, polyetherimide, polyethersulfone, polyphenylene sulfide, polyether ketone, polyether ether ketone, ABS resins (acrylonitrile butadiene styrene copolymer), polystyrene, polybutadiene, polyacrylate, polyacrylonitrile, polyacetal, polycarbonate, polyphenylene ether, EVA resins (ethylene vinyl acetate copolymer), polyvinyl acetate, liquid crystal polymers, ethylene-tetrafluoroethylene copolymers, polyvinyl fluoride, polyvinylidene fluoride, polyvinylidene chloride and teflon. Therefore, the injection-molded body may comprise the plastics. In addition, here, the mixing of two or more of the above-exemplified plastics also includes a case where two or more types of the polymers are simply mixed and a modified resin or a copolymer prepared by polymerizing monomers constituting the polymers with each other.

The present application may resolve optical defects such as the rainbow phenomenon occurring in the injection-molded body alone by arranging a retardation film having large optical anisotropy as a retardation film on at least one side of the injection-molded body at a predetermined position.

In this specification, the retardation film having large optical anisotropy may be referred to as an asymmetric retardation film. In addition, such a retardation film having large optical anisotropy may also have usually anisotropic mechanical properties. Here, the optically large anisotropy of the retardation film means a case where the retardation film has an in-plane phase difference described below.

In one example, the retardation film may have an in-plane phase difference of about 1,000 nm or more. The in-plane phase difference is a value for light having a wavelength of 550 nm, and is a physical amount defined by Equation 1 above. In another example, the in-plane phase difference of the retardation film may be 1500 nm or more, 2000 nm or more, 2500 nm or more, 3000 nm or more, 3500 nm or more, 4000 nm or more, 4500 nm or more, 5000 nm or more, 5500 nm or more, 6000 nm or more, 6500 nm or more, 7000 nm or more, 7500 nm or more, 8000 nm or more, 8500 nm or more, 9000 nm or more, or 9500 nm or more, or may also be 100000 nm or less, 90000 nm or less, 80000 nm or less, 70000 nm or less, 60000 nm or less, 50000 nm or less, 40000 nm or less, 30000 nm or less, 20000 nm or less, 15000 nm or less, 14000 nm or less, 13000 nm or less, 12000 nm or less, 10000 nm or less, 9500 nm or less, 9000 nm or less, 8500 nm or less, 8000 nm or less, 7,500 nm or less, 7000 nm or less, 6500 nm or less, 6000 nm or less, 5500 nm or less, 5000 nm or less, or 4500 nm or less or so.

The specific type of the retardation film that can be applied in the present application is not particularly limited, as long as it represents the in-plane phase difference in the above-mentioned range. For example, an anisotropic polymer film or sheet, which gives optical anisotropy by stretching, or a liquid crystal film or liquid crystal coating layer may be used as the retardation film. The polymer film may be exemplified by, for example, a polyolefin film such as a polyethylene film or a polypropylene film, a cycloolefin polymer (COP) film such as a polynorbornene film, a polyvinyl chloride film, a polyacrylonitrile film, a polysulfone film, a polyacrylate film, a PVA (poly(vinyl alcohol)) film or a cellulose ester-based polymer film such as a TAC (triacetyl cellulose) film, a polyester film or a polycarbonate film, or a copolymer film of two or more monomers among monomers forming the polymer, and the like. Furthermore, the liquid crystal film or the liquid crystal coating layer is a retardation film formed using a liquid crystal polymer or formed using a polymerizable liquid crystal compound (so-called RM (reactive mesogen)).

In one example, as the retardation film, a polyester film such as a PET (poly(ethylene terephthalate)) film may be applied. That is, films exhibiting the in-plane phase difference in the above-described range are well known in the industry, and in the case of polymer films, the films as above exhibit optically large anisotropy as well as large asymmetry properties in the mechanical properties due to high stretching or the like in the manufacturing process. A typical example of such retardation films known in the industry is a stretched polyester film, such as a stretched PET (poly (ethylene terephthalate)) film.

Accordingly, in one example, a polyester film such as a PET film may be applied as the retardation film, but the type of retardation films applicable in the present application is not limited thereto.

The thickness direction phase difference of the retardation film is not particularly limited as well. That is, for optical compensation of the injection-molded body, the in-plane phase difference of the retardation film and the arrangement of the slow axis have to be controlled, and the thickness direction phase difference can be appropriately selected within the range without impairing the desired effect. The thickness direction phase difference of the retardation film is usually within a range of −10000 nm to 10000 nm (based on a wavelength of 550 nm). In another example, the thickness direction phase difference may be −9000 nm or more, −8000 nm or more, −7000 nm or more, −6000 nm or more, −5000 nm or more, −4000 nm or more, −3000 nm or more, −2000 nm or more, −1000 nm or more, −900 nm or more, −800 nm or more or more, −700 nm or more, −600 nm or more, −500 nm or more, −400 nm or more, −300 nm or more, −200 nm or more, −100 nm or more, or −50 nm or more, or may also be 9000 nm or less, 8000 nm or less, 7000 nm or less, 6000 nm or less, 5000 nm or less, 4000 nm or less, 3000 nm or less, 2000 nm or less, 1000 nm or less, 900 nm or less, 800 nm or less, 700 nm or less, 600 nm or less, 500 nm or less, 400 nm or less, 300 nm or less, 200 nm or less, 100 nm or less, or 50 nm or less or so.

Such retardation films may have characteristics of so-called +A films (films satisfying Equation 3 below), −A films (films satisfying Equation 4 below), +B films (films satisfying Equation 5 below), Z films (films satisfying Equation 6 below) or −B film (film satisfying Equation 7 below).

$$nx > ny = nz \quad \text{[Equation 3]}$$

$$nx = nz > ny \quad \text{[Equation 4]}$$

$$nz > nx > ny \quad \text{[Equation 5]}$$

$$nx > nz > ny \quad \text{[Equation 6]}$$

$$nx > ny > nz \quad \text{[Equation 7]}$$

In Equations 3 to 7, the definitions of nx, ny and nz are the same as defined in Equations 1 and 2.

The thickness of the retardation film is not particularly limited as well, and considering the refractive index anisotropy of the retardation film, an appropriate thickness may be selected so that the in-plane phase difference within the above-mentioned range can be secured.

For proper optical compensation, the slow axis of the retardation film needs to be controlled in the relationship with the injection-molded body. As described above, the slow axis of the injection-molded body is randomly formed, so that a compensation method considering the slow axis of the injection-molded body cannot be applied. However, the purpose can be achieved by controlling the slow axis of the retardation film in the relationship with the injection direction of the injection-molded body. Here, the injection direction means a direction where the plastic material melted in the injection molding process is injected into a mold.

In the injection-molded product of the present application, the angle formed by the slow axis of the retardation film and the injection direction of the injection-molded body may be within a range of 0 degrees to 80 degrees. By adjusting the angle in such a range, an appropriately optically-compensated injection-molded product can be provided. The angle may be an angle measured in the clockwise direction or counterclockwise direction based on the injection direction in a state where the injection-molded body is at the bottom of the retardation film.

In another example, the angle may be 5 degrees or more, 10 degrees or more, 15 degrees or more, 20 degrees or more, 25 degrees or more, 30 degrees or more, 35 degrees or more, 40 degrees or more, 45 degrees or more, 50 degrees or more, 55 degrees or more, 60 degrees or more, 65 degrees or more, or 70 degrees or more, or may also be 75 degrees or less, 70 degrees or less, 65 degrees or less, 60 degrees or less, 55 degrees or less, 50 degrees or less, 45 degrees or less, 40 degrees or less, 35 degrees or less, 30 degrees or less, or 25 degrees or less or so.

The method of incorporating the retardation film into the injection-molded product so as to have the arrangement with the injection direction is not particularly limited. For example, if the surface of the injection-molded body to which the retardation film is to be disposed is an approximately flat surface, the retardation film may be attached to the surface considering the slow axis of the retardation film and the injection direction, or the retardation film may be formed by a method of coating a material, such as a liquid crystal composition, which can form a retardation layer, on the surface. In addition, if the surface of the injection-molded body to which the retardation film is to be disposed is not flat, the retardation film may be bent to follow the surface and attached to the surface considering the slow axis and the injection direction, or the retardation film may be formed by a method of coating a material, such as a liquid crystal composition, which can form a retardation layer, on the surface.

The injection-molded product may comprise necessary well-known configurations in addition to the injection-molded body and the retardation film. An example of such a configuration may be exemplified by a pressure-sensitive adhesive or adhesive layer for attaching the retardation film to the injection-molded body or the like, but is not limited thereto, and other components may also be included as necessary. For example, if the injection-molded product is an eyewear used in AR (augmented reality) or VR (virtual reality) techniques, the injection-molded product may further comprise components (for example, transmittance-variable devices, etc.) for implementing the AR or VR.

The present application also relates to the injection-molded product as an eyewear.

In this case, the injection-molded product (eyewear) may comprise an eyewear body, which is an injection-molded body; and a retardation film disposed on at least one side of the eyewear body and having an in-plane phase difference of 1,000 nm or more for light having a wavelength of 550 nm.

In the category of the eyewear, eyewear applied to various applications, for example, sports goggles, an eyewear for realizing VR or AR and various eyewear including general glasses or sunglasses, and the like may be included. The type of the eyewear is not particularly limited as well, and various types, including known types, for example, the type shown in FIG. 2 or 3 may be applied.

The eyewear body usually comprises a left eye region and a right eye region. The left eye region is a region (e.g., the lens region for the left eye) where the left eye is located when the wearer wears the eyewear, and the right eye region is a region (the lens region for the right eye) where the right eye is located when the wearer wears the eyewear.

In the case of the eyewear as above, the contents described in the above-mentioned injection-molded product may also be applied in the same manner.

For example, the eyewear body may have a phase difference in a range of 800 nm to 3,000 nm for a wavelength of 550 nm. In another example, the phase difference may be about 850 nm or more, 900 nm or more, 950 nm or more, 1000 nm or more, 1100 nm or more, 1200 nm or more, 1300 nm or more, 1400 nm or more, 1500 nm or more, 1600 nm or more, 1700 nm or more, 1800 nm or more, or 1900 nm or more, or may be 2900 nm or less, 2800 nm or less, 2700 nm or less, 2600 nm or less, 2500 nm or less, 2400 nm or less, 2300 nm or less, 2200 nm or less, 2100 nm or less, or 2000 nm or less or so. The phase difference is obtained as a result of being measured in the manner described in examples herein. Since the injection-molded body is randomly stressed during a forming process, the slow axis of the eyewear may also be formed randomly.

The type of the material forming the eyewear body is not particularly limited, and any plastic material that is usually applied to the manufacture of eyewear may be applied. In the case of the eyewear body, it is produced by applying nylon or polycarbonate, and the like.

Regarding the characteristics and types of the retardation film applied to at least one side of the eyewear body, for example, the phase difference or material, and the like, the above-described contents may also be applied in the same manner.

For example, the in-plane phase difference of the retardation film for a wavelength of 550 nm may be about 1,000 nm or more, and in another example, it may be 1500 nm or more, 2000 nm or more, 2500 nm or more, 3000 nm or more, 3500 nm or more, 4000 nm or more, 4500 nm or more, 5000 nm or more, 5500 nm or more, 6000 nm or more, 6500 nm or more, 7000 nm or more, 7500 nm or more, 8000 nm or more, 8500 nm or more, 9000 nm or more, or 9500 nm or more, or may also be 100000 nm or less, 90000 nm or less, 80000 nm or less, 70000 nm or less, 60000 nm or less, 50000 nm or less, 40000 nm or less, 30000 nm or less, 20000 nm or less, 15000 nm or less, 14000 nm or less, 13000 nm or less, 12000 nm or less, 10000 nm or less, 9500 nm or less, 9000 nm or less, 8500 nm or less, 8000 nm or less, 7500 nm or less, 7000 nm or less, 6500 nm or less, 6000 nm or less, 5500 nm or less, 5000 nm or less, or 4500 nm or less or so.

In addition, the retardation film may also be the above-described polymer film, or may be the liquid crystal film or the liquid crystal coating layer.

Even in the case of the eyewear, for proper optical compensation, the slow axis of the retardation film needs to be controlled in the relationship with the eyewear body. That is, the angle formed by the injection direction of the eyewear body and the slow axis of the retardation film may be in a range of 0 degrees to 80 degrees. The angle may be an angle measured in the clockwise direction or counterclockwise direction based on the injection direction in a state where the eyewear body is located at the bottom of the retardation film. In another example, the angle may be 5 degrees or more, 10 degrees or more, 15 degrees or more, 20 degrees or more, 25 degrees or more, 30 degrees or more, 35 degrees or more, 40 degrees or more, 45 degrees or more, 50 degrees or more, 55 degrees or more, 60 degrees or more, 65 degrees or more, or 70 degrees or more, or may also be 75 degrees or less, 70 degrees or less, 65 degrees or less, 60 degrees or less, 55 degrees or less, 50 degrees or less, 45 degrees or less, 40 degrees or less, 35 degrees or less, 30 degrees or less, or 25 degrees or less or so.

Usually, in the case of the eyewear body, the virtual line connecting the respective centers of the left eye region and the right eye region and the injection direction are often perpendicular to each other. Therefore, in this case, the angle formed by the slow axis of the retardation film and the virtual line may be within a range of 10 degrees to 170 degrees. The angle may be an angle that the angle to the slow axis is measured in the clockwise direction or counterclockwise direction based on the virtual line.

Here, the center of the left eye region or the right eye region may be the mass center of the left eye region or the right eye region, respectively, or may be a region corresponding to the left eye and right eye of a wearer wearing the eyewear.

In another example, the angle may be 15 degrees or more, 20 degrees or more, 25 degrees or more, 30 degrees or more, 35 degrees or more, 40 degrees or more, 45 degrees or more, 50 degrees or more, 55 degrees or more, 60 degrees or more, 65 degrees or more, 70 degrees or more, 75 degrees or more, 80 degrees or more, 85 degrees or more, 90 degrees or more, 95 degrees or more, 100 degrees or more, 105 degrees or more, 110 degrees or more, 115 degrees or more, 120 degrees or more, 125 degrees or more, 130 degrees or more, 135 degrees or more, 140 degrees or more, 145 degrees or more, 150 degrees or more, 155 degrees or more, or 160 degrees or more, or may also be 165 degrees or less, 160 degrees or less, 155 degrees or less, 150 degrees or less, 145 degrees or less, 140 degrees or less, 135 degrees or less, 130 degrees or less, 125 degrees or less, 120 degrees or less, 115 degrees or less, 110 degrees or less, 105 degrees or less, 100 degrees or less, 95 degrees or less, 90 degrees or less, 85 degrees or less, 80 degrees or less, 75 degrees or less, 70 degrees or less, 65 degrees or less, 60 degrees or less, 55 degrees or less, 50 degrees or less, 45 degrees or less, or 40 degrees or less or so.

The eyewear may also comprise other components in addition to the eyewear body and retardation film.

In this way, it is possible to provide eyewear in which optical defects such as a rainbow phenomenon are not observed.

Advantageous Effects

The present application relates to an optically compensated injection-molded product, which may provide an injection-molded product that resolves optical defects such as a rainbow phenomenon occurring in the injection-molded product.

MODE FOR INVENTION

Hereinafter, the present application will be described in detail through examples, but the scope of the present application is not limited by the following examples.

1. Phase Difference Evaluation

In-plane phase differences (Rin) of a retardation film and an injection-molded body were measured for light with a wavelength of 550 nm according to the following method using Agilent's UV/VIS spectroscope 8453 equipment. After installing two polarizers on the UV/VIS spectroscope so that their transmission axes were orthogonal to each other and installing a retardation film so that the slow axis of the retardation film between the two polarizers was set to be 45 degrees with each transmission axis of the two polarizers, transmittance according to wavelengths was measured. In the case of the injection-molded body, the direction of the slow axis was not constant, whereby it was installed such that the injection direction was set to be 45 degrees with each transmission axis of the two polarizers. The phase retardation orders of the respective peaks are obtained from the transmittance graph according to the wavelength. Specifically, the waveform in the transmittance graph according to the wavelength satisfies Equation A below, and the maximum peak (Tmax) condition in the sine wave satisfies Equation B below. In the case of λmax in Equation A, T in Equation A and T in Equation B are the same, so that the equations are developed. If the equations are developed for n+1, n+2 and n+3, and n is arranged into λn and λn+1 equations by arranging the n and n+1 equations to eliminate R, Equation C below is derived. Since n and λ can be known based on the fact that T in Equation A and T in Equation B are the same, R is obtained for each of λn, λn+1, λn+2 and λn+3. For 4 points, the straight trend line of the R values according to the wavelength is obtained, and the R value for the equation 550 nm is calculated. The function of the straight trend line is Y=ax+b, where a and b are constants. The Y value when 550 nm is substituted into x of the above function is the Rin value for light with a wavelength of 550 nm.

$T=\sin^2[(2\pi R/\lambda)]$  [Equation A]

$T=\sin^2[((2n+1)\pi/2)]$  [Equation B]

$n=(\lambda n-3\lambda n+1)/(2\lambda n+1-2\lambda n)$  [Equation C]

Here, R means an in-plane phase difference (Rin), λ means a wavelength, and n means a vertex degree of a sine waveform.

Example 1

Figure 1:
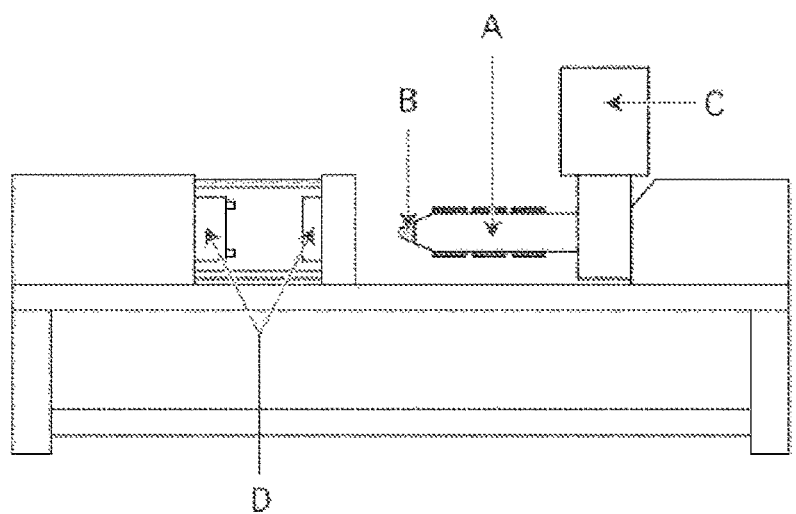
FIG. 1 is a diagram showing the structure of an exemplary injection molding machine.
Figure 2:
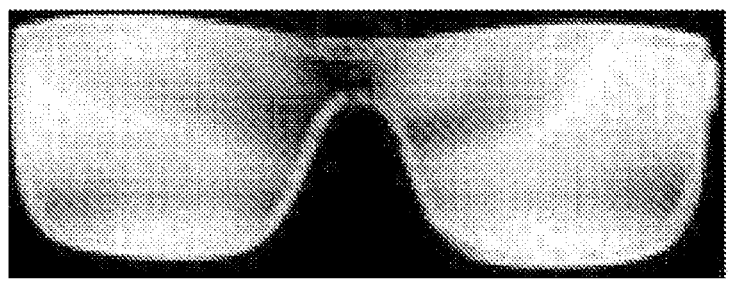
FIG. 2 is a photograph showing a rainbow phenomenon of an injection-molded product that is not optically compensated.
Figure 3:
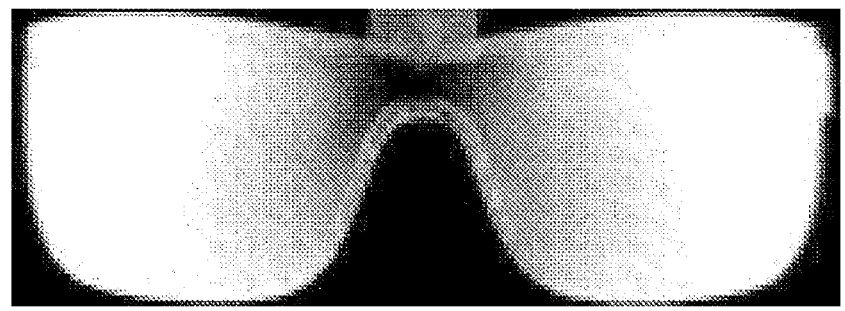
FIG. 3 is a photograph of an extrusion-molded product.
Figure 4:
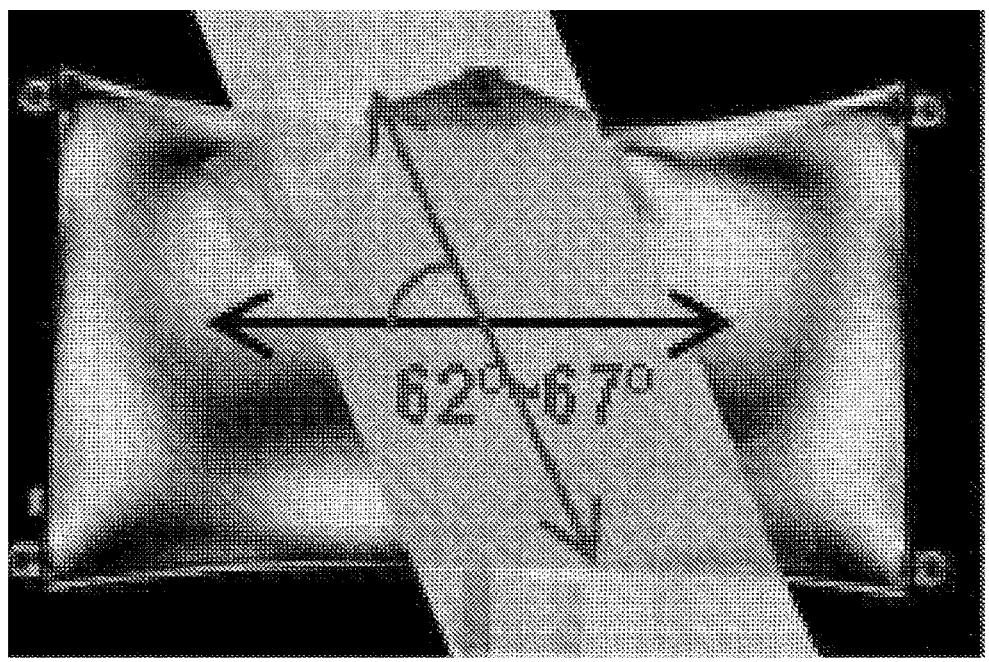
FIGS. 4 to 7 are photographs confirming optical characteristics of the injection-molded products in Examples.
Figure 12:
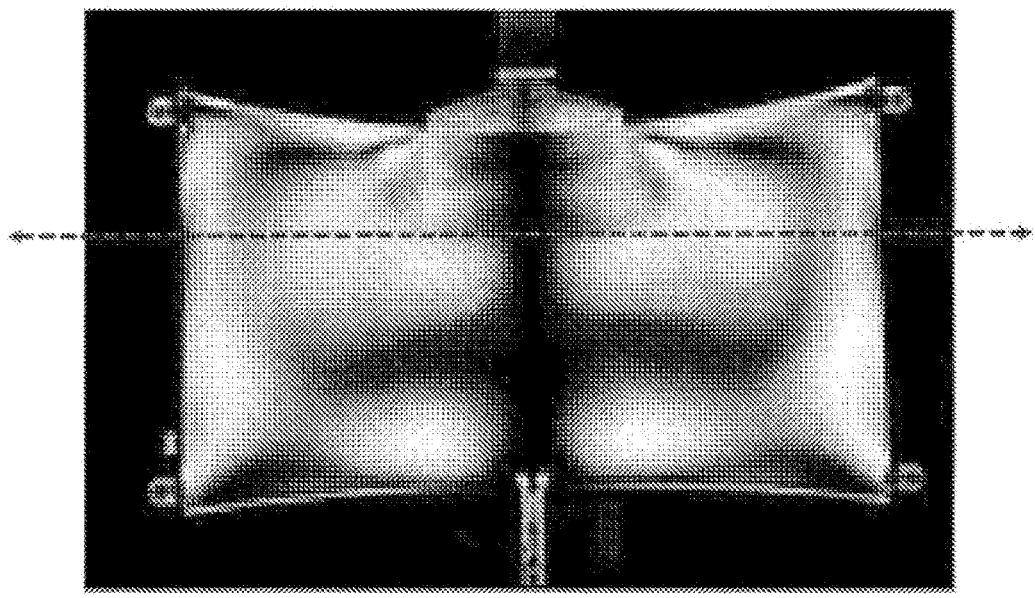

A polycarbonate (PC) plate (injection-molded body) produced by injection-molding PC and having a rectangular shape as shown in FIG. 12 was applied as one applied to formation of an eyewear body. As shown in FIG. 12, the injection-molded body exhibits a severe rainbow phenomenon under a polarized light source. Meanwhile, the injection direction of the injection-molded body is approximately perpendicular to the horizontal direction (arrow direction) described in the drawing. The optical compensation was performed using a PET (poly(ethylene terephthalate)) film (125 μm PET product from SKC) having an in-plane phase difference of approximately 4400 nm or so for a wavelength of 550 nm as a retardation film. At this time, the angle of the slow axis was set to be within a range of approximately 23 degrees to 28 degrees when measured in the counterclockwise direction based on the injection direction (direction perpendicular to the arrow direction in FIG. 12) of the injection-molded body. FIG. 4 is a photograph showing the result, and optical defects such as a rainbow phenomenon were not observed in the region where the retardation film was present as in the photo.

Example 2

Figure 5:
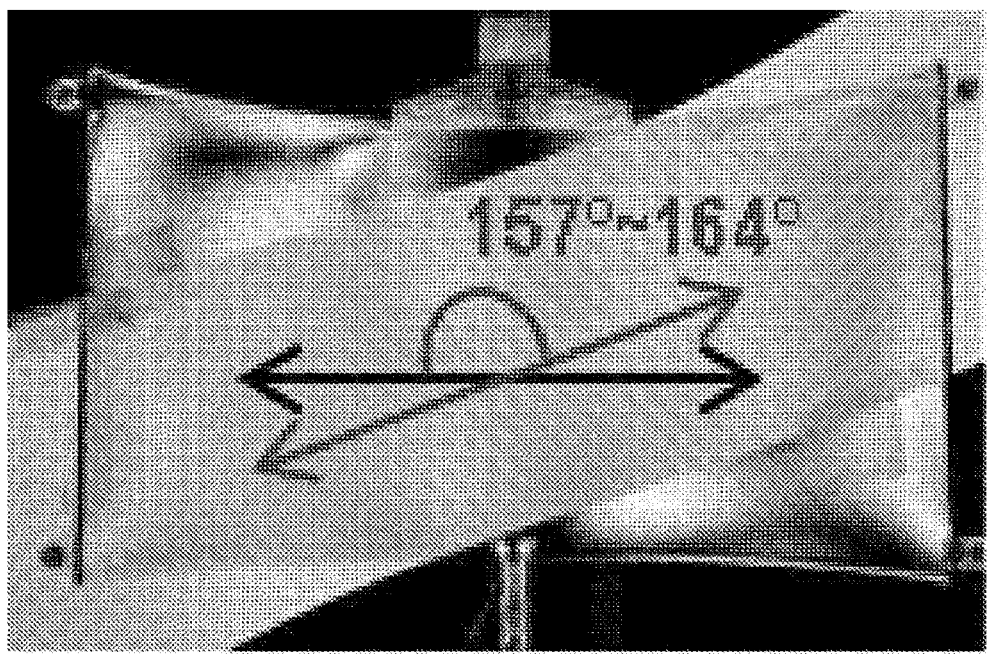

The optical compensation was performed in the same manner as in Example 1, except that the slow axis angle of the retardation film was set to be within a range of approximately 67 degrees to 74 degrees when measured in the clockwise direction based on the injection direction (direction perpendicular to the arrow direction in FIG. 12) of the injection-molded body. FIG. 5 is a photograph showing the result, and optical defects such as a rainbow phenomenon were not observed in the region where the retardation film was present as in the photo.

Example 3

Figure 6:
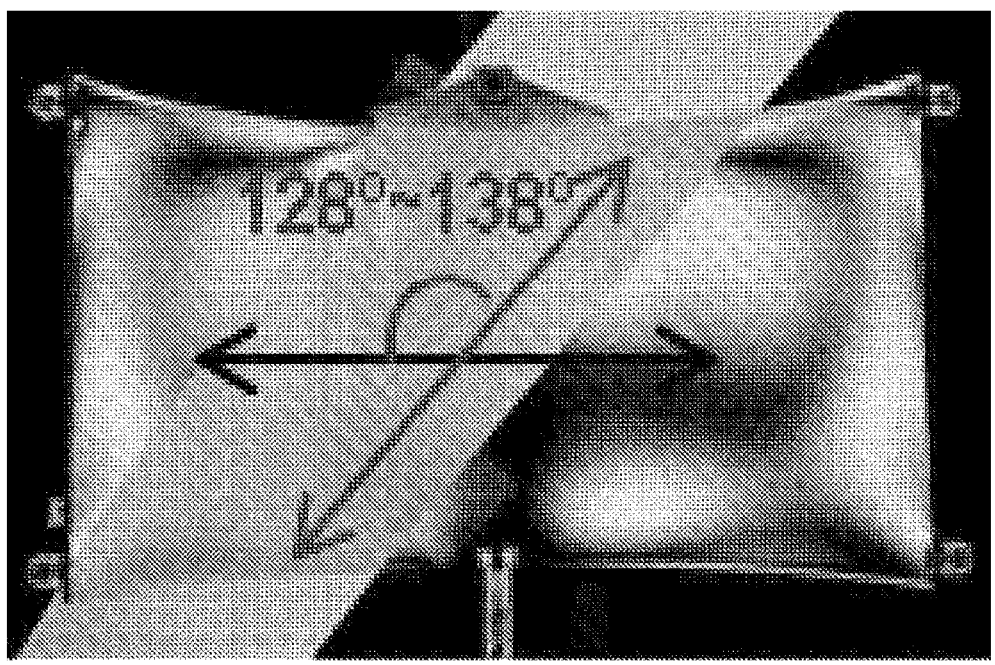

The optical compensation of the same injection-molded body as that of Example 1 was performed using a PET (poly(ethylene terephthalate)) film having an in-plane phase difference of approximately 9800 nm for a wavelength of 550 nm (a film of the grade showing the in-plane phase difference among SRF products from Toyobo) as the retardation film. At this time, the slow axis angle was set to be within a range of approximately 38 degrees to 48 degrees when measured in the clockwise direction based on the injection direction (direction perpendicular to the arrow direction in FIG. 12) of the injection-molded body. FIG. 6 is a photograph showing the result, and optical defects such as a rainbow phenomenon were not observed in the region where the retardation film was present as in the photo.

Example 4

Figure 7:
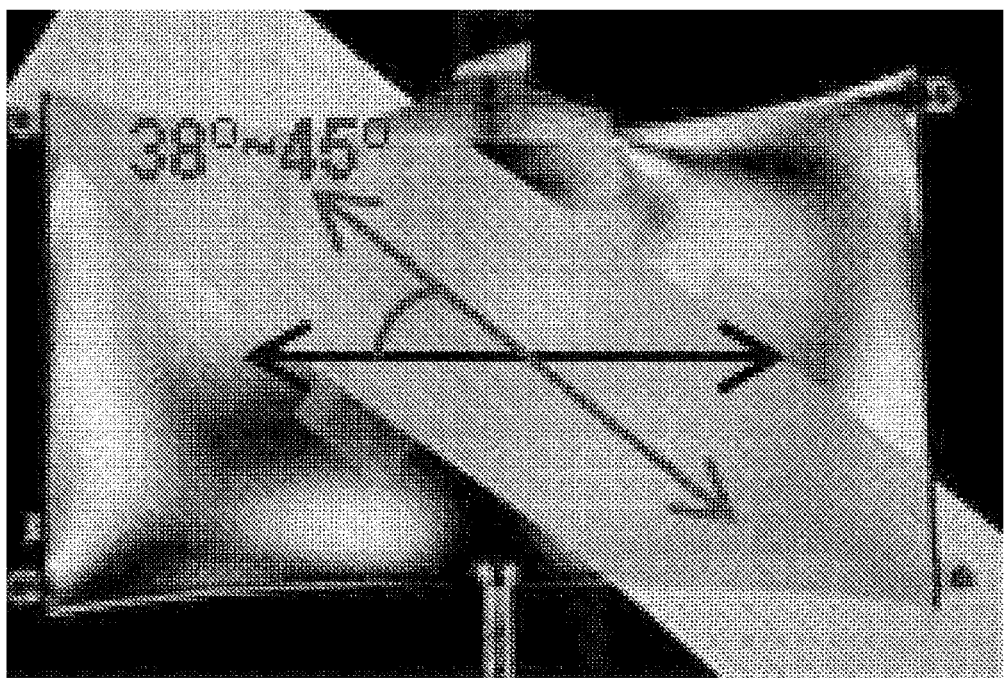

The optical compensation was performed in the same manner as in Example 3, except that the slow axis angle of the retardation film was set to be within a range of approximately 45 degrees to 52 degrees when measured in the counterclockwise direction based on the injection direction of the injection-molded body (direction perpendicular to the arrow direction in FIG. 12). FIG. 7 is a photograph showing the result, and optical defects such as a rainbow phenomenon were not observed in the region where the retardation film was present as in the photo.

Comparative Example 1

Figure 8:
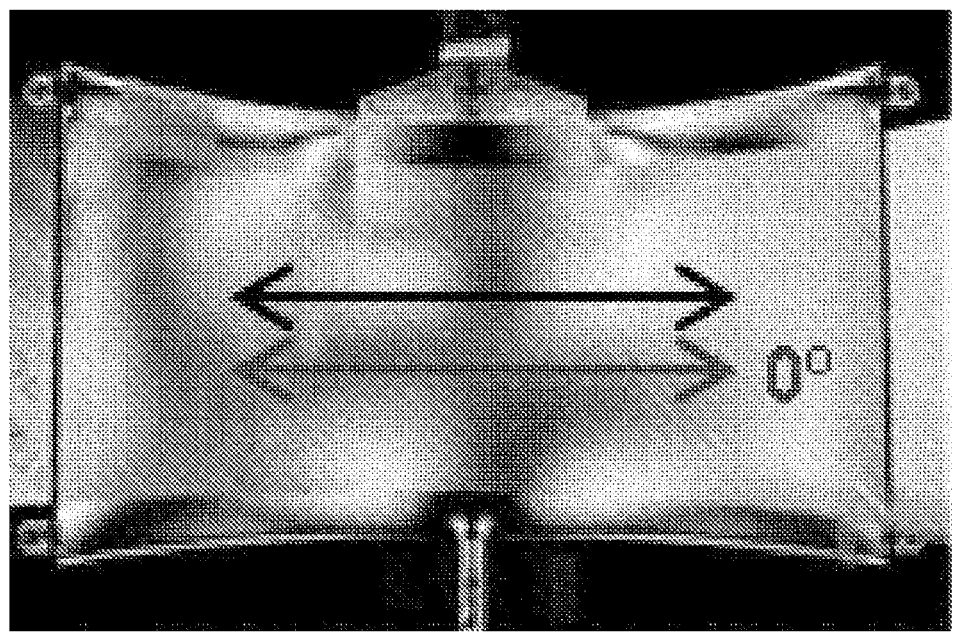
FIGS. 8 to 12 are photographs confirming optical characteristics of the injection-molded products in Comparative Examples.

The optical compensation was performed in the same manner as in Example 1, except that the slow axis angle of the retardation film was set to be approximately 90 degrees based on the injection direction (the direction perpendicular to the arrow direction in FIG. 12) of the injection-molded body. FIG. 8 is a photograph showing the result, and a rainbow phenomenon was observed even in the region where the retardation film was present as in the photo, thereby confirming optical defects.

Comparative Example 2

Figure 9:
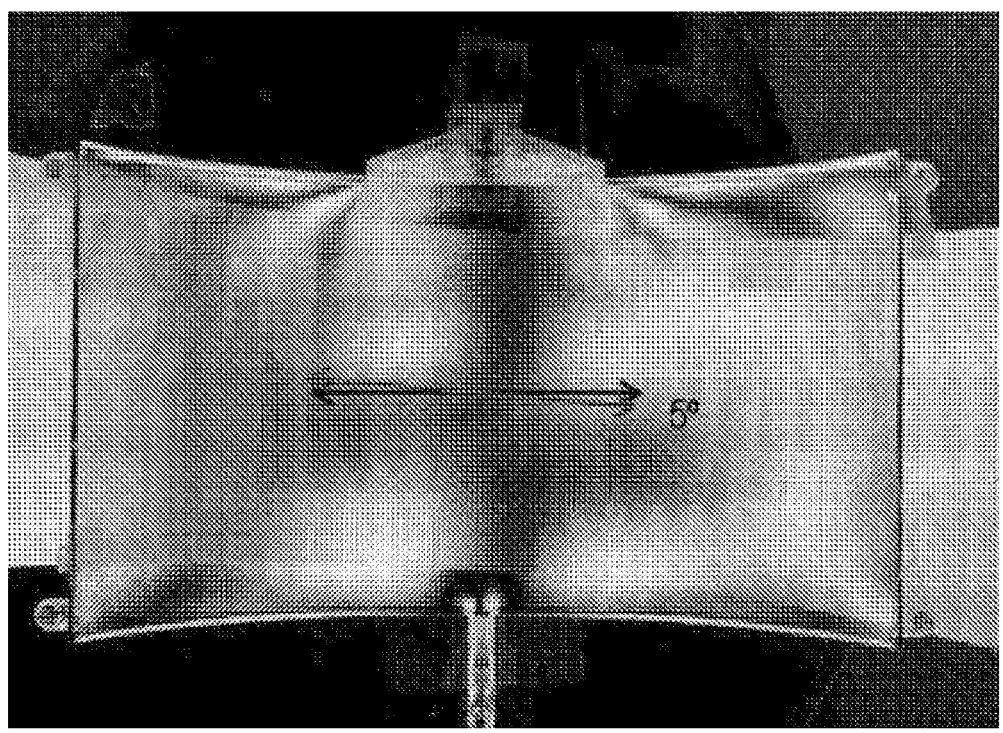

The optical compensation was performed in the same manner as in Example 1, except that the slow axis angle of the retardation film was set to be within a range of approximately 85 degrees when measured in the counterclockwise direction based on the injection direction (direction perpendicular to the arrow direction in FIG. 12) of the injection-molded body. FIG. 9 is a photograph showing the result, and a rainbow phenomenon was observed even in the region where the retardation film was present as in the photo, thereby confirming optical defects.

Comparative Example 3

Figure 10:
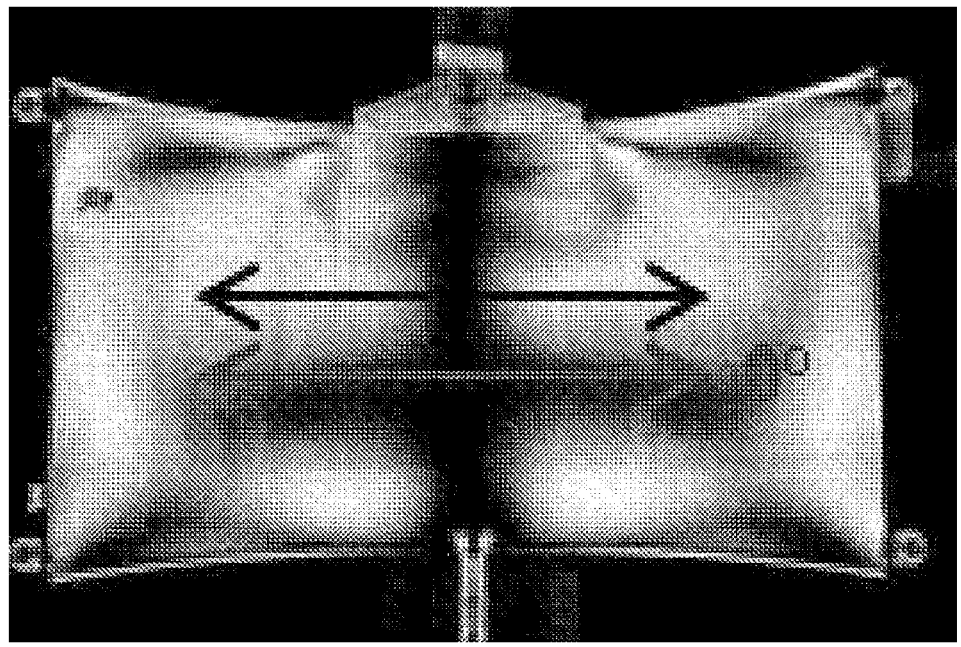

The optical compensation was performed in the same manner as in Example 3, except that the slow axis angle of the retardation film was set to be approximately 90 degrees based on the injection direction (direction perpendicular to the arrow direction in FIG. 12) of the injection-molded body. FIG. 10 is a photograph showing the result, and a rainbow phenomenon was observed even in the region where the retardation film was present as in the photo, thereby confirming optical defects.

Comparative Example 4

Figure 11:
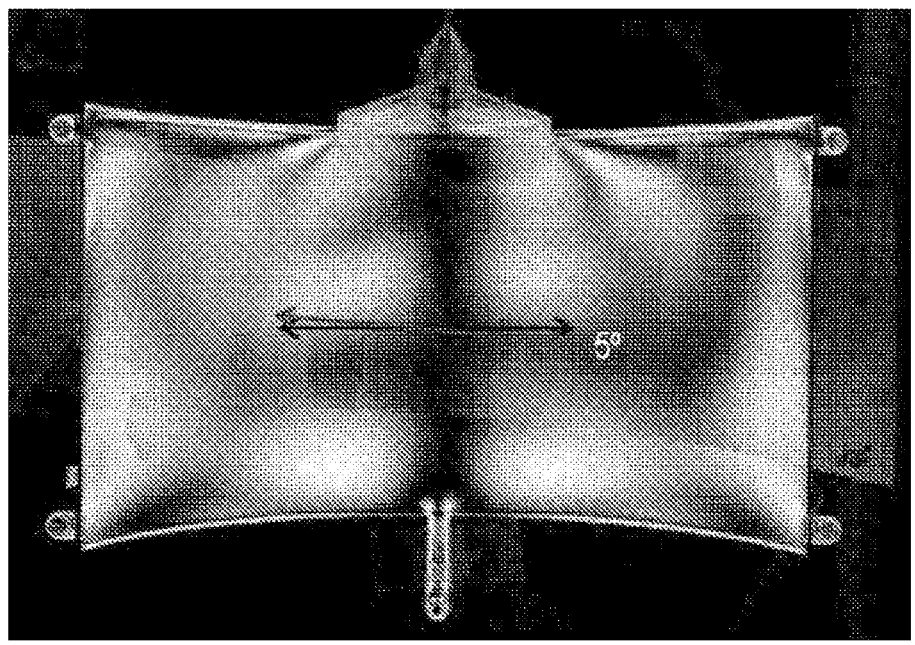

The optical compensation was performed in the same manner as in Example 3, except that the slow axis angle of the retardation film was set to be within a range of approximately 85 degrees when measured in the counterclockwise direction based on the injection direction (direction perpendicular to the arrow direction in FIG. 12) of the injection-molded body. FIG. 11 is a photograph showing the result, and a rainbow phenomenon was observed even in the region where the retardation film was present as in the photo, thereby confirming optical defects.

The invention claimed is:

1. An injection-molded product, comprising:
an injection-molded body; and
a retardation film disposed on at least one side of the injection-molded body,
wherein the retardation film has an in-plane phase difference of 1,000 nm or more for light having a wavelength of 550 nm and comprises only one slow axis, and wherein an angle formed by the slow axis of the retardation film and an injection direction of the injection-molded body is in a range from 0 degree to 80 degrees,
wherein the injection direction is a direction along which melted plastic material is injected into a mold to form the injection-molded body, and
wherein the injection-molded body has an in-plane phase difference in a range of 800 nm to 3,000 nm for light having a wavelength of 550 nm.

2. The injection-molded product according to according to claim 1, wherein the injection-molded body is a molded body comprising one or more plastics selected from the group consisting of polyvinyl chloride, polyolefin, polyester, nylon, polyamide, polysulfone, polyetherimide, polyethersulfone, polyphenylene sulfide, polyether ketone, polyether ether ketone, ABS resins, polystyrene, polybutadiene, polyacrylate, polyacrylonitrile, polyacetal, polycarbonate, polyphenylene ether, EVA resins, polyvinyl acetate, liquid crystal polymers, ethylene-tetrafluoroethylene copolymers, polyvinyl fluoride, polyvinylidene fluoride, polyvinylidene chloride and teflon.

3. The injection-molded product according to claim 1, wherein the in-plane phase difference of the retardation film is 2,000 nm or more for light having a wavelength of 550 nm.

4. The injection-molded product according to claim 1, wherein the in-plane phase difference of the retardation film is 3,000 nm or more for light having a wavelength of 550 nm is 3,000 nm or more.

5. The injection-molded product according to claim 1, wherein the retardation film is a polymer film or a liquid crystal film.

6. The injection-molded product according to claim 1, wherein the injection-molded body is an eyewear.

7. An Eyewear, comprising:
an eyewear body comprising a left eye region and a right eye region; and
a retardation film disposed on at least one side of the eyewear body,
wherein the eyewear body is an injection-molded body,
wherein the retardation film has an in-plane phase difference of 1,000 nm or more for light having a wavelength of 550 nm and comprises only one slow axis,
wherein an angle formed by a virtual line connecting respective mass centers of the left eye region and the right eye region in the eyewear body and a slow axis of the retardation film is from 10 degrees to 170 degrees, and
wherein the eyewear body has an in-plane phase difference in a range of 800 nm to 3,000 nm for light having a wavelength of 550 nm.

8. The eyewear according to claim 7, wherein the eyewear body is a molded body comprising one or more plastics selected from the group consisting of polycarbonate and nylon.

9. The eyewear according to claim 7, wherein the in-plane phase difference of the retardation film is 2,000 nm or more for light having a wavelength of 550 nm.

10. The eyewear according to claim 7, wherein the in-plane phase difference of the retardation film is 3,000 nm or more for light having a wavelength of 550 nm.

11. The eyewear according to claim 7, wherein the retardation film is a polymer film or a liquid crystal film.

\* \* \* \* \*